United States Patent [19]

Angell et al.

[11] Patent Number: 5,506,073
[45] Date of Patent: Apr. 9, 1996

[54] LITHIUM ION CONDUCTING ELECTROLYTES

[75] Inventors: C. Austen Angell; Changle Liu, both of Tempe, Ariz.

[73] Assignee: Arizona State University (Arizona Board of Regents, a body corporate acting on behalf of Arizona State University), Tempe, Ariz.

[21] Appl. No.: 901,669

[22] Filed: Jun. 22, 1992

[51] Int. Cl.⁶ .................. H01M 6/18; H01M 6/14
[52] U.S. Cl. .................. 429/199; 429/191; 429/192
[58] Field of Search .................. 429/199, 191, 429/207, 193, 190, 188

[56] References Cited

U.S. PATENT DOCUMENTS

| | | | |
|---|---|---|---|
| 3,445,290 | 5/1969 | Elliott et al. | 429/199 |
| 3,615,828 | 10/1971 | Fischer | 429/199 X |
| 4,234,667 | 11/1980 | Bennion | 429/199 X |
| 4,367,269 | 1/1983 | Nagai et al. | 429/191 |

FOREIGN PATENT DOCUMENTS

| | | | |
|---|---|---|---|
| 130507 | 1/1985 | European Pat. Off. | 429/199 |
| 110429 | 8/1979 | Japan | 429/199 |
| 532916 | 2/1977 | U.S.S.R. | 429/191 |

*Primary Examiner*—John S. Maples

[57] ABSTRACT

A liquid, predominantly lithium-conducting, ionic electrolyte having exceptionally high conductivity at temperatures of 100° C. or lower, including room temperature, and comprising the lithium salts selected from the group consisting of the thiocyanate, iodide, bromide, chloride, perchlorate, acetate, tetrafluoroborate, perfluoromethane sulfonate, perfluoromethane sulfonamide, tetrahaloaluminate, and heptahaloaluminate salts of lithium, with or without a magnesium-salt selected from the group consisting of the perchlorate and acetate salts of magnesium. Certain of the latter embodiments may also contain molecular additives from the group of acetonitrile ($CH_3CN$) succinnonitrile ($CH_2CN)_2$, and tetraglyme ($CH_3$-O-$CH_2$-$CH_2$-O-$)_2$ (or like solvents) solvated to a $Mg^{+2}$ cation to lower the freezing point of the electrolyte below room temperature. Other particularly useful embodiments contain up to about 40, but preferably not more than about 25, mol percent of a long chain polyether polymer dissolved in the lithium salts to provide an elastic or rubbery solid electrolyte of high ambient temperature conductivity and exceptional 100° C. conductivity. Another embodiment contains up to about but not more than 10 mol percent of a molecular solvent such as acetone.

21 Claims, 2 Drawing Sheets

LITHIUM ION CONDUCTING ELECTROLYTES

Financial assistance for this project was provided by U.S. Government Grant No. DE-FG02-89ER4535398 awarded by the Department of Energy and the United States Government may own certain rights in this invention.

Some of the work described herein was supported by DOE Grant No. DE-FG 02-89 ER 4535398. The United States government may have certain rights to this invention.

INTRODUCTION

The present invention relates generally to lithium ion high conducting, non-crystalline electrolyte systems and more particularly to a novel and unique class of liquid and/or solid electrolyte systems which are especially well suited for use with high current density systems such as primary and secondary batteries.

BACKGROUND OF THE INVENTION

In the search for suitable materials from which to construct high energy density solid state batteries, one of the principal obstacles has been the provision of a suitable electrolyte. A variety of approaches have been tried heretofore. The one which received the most attention among those prior approaches is the one based on polymer solvents in which an optimized amount of ionic salt is dissolved in the polymer solvent (See Armand et al., U.S. Pat. No. 4,303,748; Andre et al., U.S. Pat. No. 4,357,401; and Kronfli et al., U.S. Pat. No. 5,009,970). Other approaches, which possessed both specific advantages and disadvantages, involved glassy solid electrolytes, and certain plastic crystal or disordered crystal electrolytes. Neither of these approaches, nor, indeed, did any of the prior art approaches, obtain all the properties generally recognized as prerequisites to the successful development of a high power solid state battery, namely, (1) high ionic conductivity (about $10^{-3} \Omega^{-1} cm^{-1}$ or above); (2) conductivity by lithium cations (to avoid undesirable cell polarization problems); (3) a rubbery consistency (to permit the deformation of the electrolyte as needed to accommodate volume changes during charging and discharging cycles); (4) a wide electrochemical window (to permit the utilization of anode/cathode combinations which provide high voltages); and (5) good adherence to the electrode surfaces (to prevent mechanical/electrical problems that could otherwise develop during charging and discharging cycles).

Each substance heretofore developed for solid electrolyte purposes possesses only a limited number of the above-identified desiderata. None achieved them all. For instance, the so-called superionic glass electrolyte, exemplified in the most successful case by $Li_2S$-LiI-Y (where Y is a Lewis acid such as $P_2S_5, B_2S_3, SiS_2$), achieves some of the above listed properties namely, 1,2,4 and 5 but is quite brittle and totally lacks the desired rubbery consistency. Examples of this type of electrolyte are described by Malugani et al. in U.S. Pat. No. 4,331,750 and by Akridge in U.S. Pat. No. 4,585,714.

The prior art salt-in-polymer approach mentioned above, satisfies three of the desiderata namely, 3,4 and 5, but fails miserably with regard to properties 1 and 2. For instance, neither of two recent U.S. Patents dealing with salt-in-polymer electrolytes reported a room temperature conductivity greater than $1 \times 10^{-5} \Omega^{-1} cm^{-1}$ for solvent-free or plasticizer-free systems (See: Kronfli et al., U.S. Pat. No. 5,009,970; Knight et al. U.S. Pat. No. 4,737,422). One prior art effort to rectify the poor conductivity of the salt-in-polymer electrolyte involved the addition of low molecular weight plasticizers to the mixture (See: Koksbang et al. *J. Power Sources* 39, 175, (1990)). However, improved conductivity was achieved at the expense of introducing unwanted volatile components into the electrolyte making the electrolyte susceptible to composition changes when it is exposed to the external atmosphere. Since the solubility of lithium salts in the polymer electrolytes is predicated upon attraction between the lithium cations and the solvating groups in the polymer, these electrolytes further suffer from the fact that the lithium is the less mobile cation. This means that the cation conductivity desideratum, identified as "2" above, is never achieved except in the poorly conducting, single mobile ion polymers which are described by Noda et al. in U.S. Pat. No. 4,844,995. It is believed that it is fundamentally unlikely that this problem can be rectified in the usual polymer/Li salt type of medium. Claims have been made that the problem can be somewhat reduced by using plasticized polymers although no verification of these claims has been found. Examplary salt-in-polymer type electrolytes are disclosed in U.S. Pat. Nos. 4,303,748; 4,357,401; 4,585,714; and 5,009,970.

As is apparent, a great need exists for the development of an improved electrolyte which obtains all of the desiderata listed above without the acquisition of unacceptable deleterious properties. It is toward this goal that the present invention is directed. A preferred embodiment of the present invention obtains all of the desiderata listed above and further provides a predominantly $Li^+$-conducting viscous liquid electrolyte suitable for use in polymer sponge or conventional paste electrolytes to obtain a conductivity which is half an order of magnitude higher at room temperature than that obtainable with any previously known polymer-based electrolyte. As will appear, the electrolyte of the present invention obtains an even greater conductivity advantage at temperatures above room temperature.

BRIEF SUMMARY OF THE INVENTION

The present invention relates to a novel high-conducting lithium-containing electrolyte comprising viscous liquid or rubbery. solid lithium salt mixtures which obtain conductivity by the decoupled motion of the lithium ions which, when produced in accordance herewith, remain freely mobile, even in a glassy state at and below $-20°$ C. In a preferred practice, a liquid lithium salt mixture, which may be supercooled at room temperature, is combined with a small mole fraction (circa 20 percent of ether oxygens) of a high molecular weight polypropylene oxide (or a functionally equivalent high molecular weight soluble polymer) which provides a rubbery consistency and which protects against crystallization of the salts. The preferred solid electrolyte of the present invention obtains a previously unheard of combination of properties, namely, (a) conductivity in the order of $10^{-2} \Omega^{-1} cm^{-1}$ at room temperature in the absence of polymer and approaches $10^{-3} \Omega^{-1} cm^{-1}$ at room temperature when modified as herein described by the dissolution of polymer in to the salt; (b) conduction by lithium cations in a manner which avoids or minimizes the problems heretofore endemic to the common lithium salts-in-polymer electrolyte solution systems; (c) a rubbery consistency which readily absorbs stress on the electrolyte; (d) good adhesion to metal electrodes; and (e) a wide electrochemical window. While one or more of the foregoing properties has been heretofore obtainable in some of the known electrolytes, no electrolyte has ever been developed which obtained all of these properties in a single system.

While superionic glass electrolytes have been heretofore known to obtain various important properties such as high conductivity and, $Li^+$ conduction hence reduction and/or elimination of polarization, this so-called superionic glass electrolyte is brittle. Furthermore, the rubbery polymer salt alternatives, which have sufficient resiliency to absorb electrolyte stress, suffer from being predominantly anion conductors. None of the known electrolytes achieves the unique combination of properties, so long desired but heretofore unobtainable, that is achieved by the present invention as is hereinafter described in detail.

Accordingly, a principal object of the present invention is to provide a new and improved lithium conducting electrolyte which obtains unexpectedly high conductivity both at room temperature and at 100° C.

Another object is to provide new and improved predominantly $Li^+$– conducting solvent-free viscous liquid electrolyte which obtains conductivity of almost $10^{-2}\Omega^{-1}cm^{-1}$ at room temperature and almost $10^{-1}\Omega^{-1}cm^{-1}$ at 100° C.

Still another object of the present invention is to provide a new and improved solvent free lithium ion conducting electrolyte containing molten lithium salts and having a long-chain high molecular weight polymer dissolved therein to provide a rubbery, non-brittle consistency to the electrolyte even at low temperatures without sacrificing the high conductivity obtained thereby.

These and still further objects as shall hereinafter appear are readily fulfilled by the present invention in a remarkably unexpected manner as will be readily discerned from the following detailed description of preferred embodiment when read in conjunction with the accompanying drawing.

DESCRIPTION OF PREFERRED EMBODIMENTS

Figure 1:
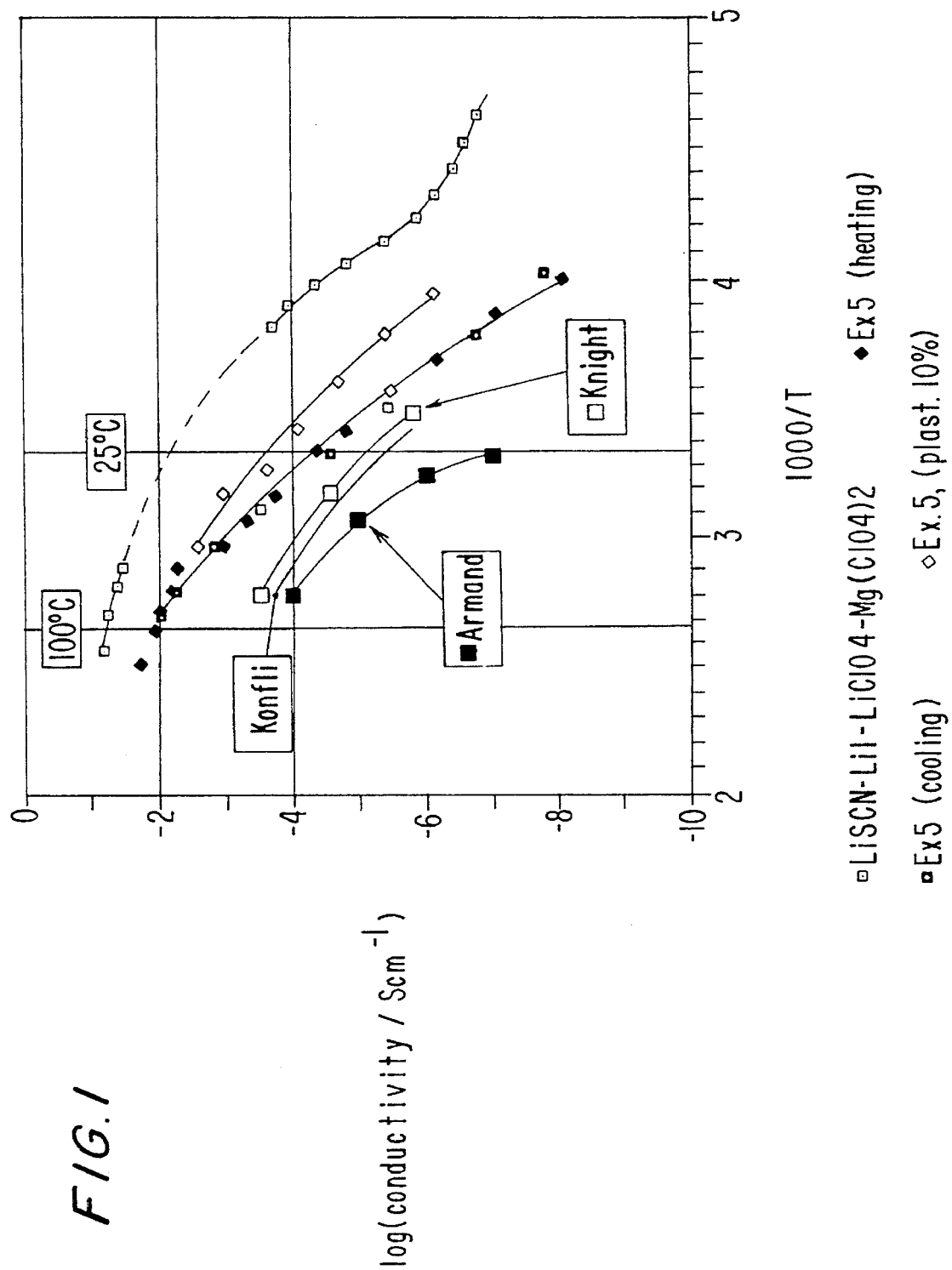
FIG. 1 is a diagram showing DC conductivity versus reciprocal absolute temperature for three related embodiments of the present invention and a comparison with prior art.

The high ionic conductive solid electrolyte of the present invention is based upon the creation of a system of the superionic glass-type of electrolyte in which, by suitable choice of components, the glass transition temperature can be pushed far below room temperature. Thus one is able to produce high conducting liquid $Li^+$ electrolytes having properties comparable to and in some ways superior to those obtained with the non-aqueous liquid $Li^+$ electrolyte heretofore known in which $Li^+$ is not the most mobile species. A second aspect of the present invention involves the dimensional stabilization of the viscous liquid lithium-conducting electrolyte by the dissolution of a relatively small amount of a long-chain (high molecular weight) polymer which, by the normal chain entanglement phenomenon, bestows a rubbery consistency to the ionic liquid. Thus, the aim of providing a predominantly $Li^+$-conducting electrolyte having exceptionally high conductivity at ambient temperature (measured as high as $10^{-2}\Omega^{-1}cm^{-1}$ at 25° C.) and capable of being obtained in a rubbery state is achieved and all of the five desiderata enumerated as goals for a new and valuable electrolyte are satisfied.

An essential and distinct feature of the new rubbery material of this invention is the high content of lithium salts relative to polymer. The preferred embodiment contains not less than 75 percent lithium salts, and not more than 25 percent polymer (based on mol percent of polymer repeat units), although some cases in which higher polymer contents (up to about 40 mol percent) have been used to lower the fusion temperatures of higher melting salt combinations as shown in Example 6 below. The high lithium content is desirable to maximize the dominance of lithium ion conduction in the material.

The salts used in preparing the electrolyte of the present invention were mostly reagent grade chemicals obtained from companies such as ALPHA, ALDRICH, and like major suppliers. They were all used without further purification. Where available, anhydrous salts were used. Among the suitable lithium salts which were useful in the practice of the present invention are the thiocyanate, iodide, bromide, chloride, nitrate, perchlorate, acetate, tetrafluoroborate, haloaluminate, such as tetrachloroaluminate, halodialuminate such as hexachlorobromodialuminate, thiohalodialuminate, such as hexachlorothiodialuminate. The haloaluminates, and halothioaluminates were prepared in house from available reagents (lithium salts and aluminum halides), trifluoromethane sulfonate and perfluoromethane sulfonimide (available from 3M). In cases such as LiSCN, the partially hydrated salts were dried under vacuum at temperatures in the vicinity of 150° C. Great care was needed in the case of LiSCN to avoid decomposition when the water content approached zero. Removal of water can be aided by the addition of acetonitrile or acetone which, in addition, are also found to aid with subsequent additions of high molecular weight polymer. It should be noted that care should always be exercised when heating any dehydrated thiocyanate in the presence of an oxidizer. Water should be removed from such compositions in the presence of excess acetone which, in turn, should be removed at low temperatures, that is, temperatures not exceeding 120° C. Suitable polymers for use in the preparation of the rubbery embodiments of the present invention are polypropylene oxide ("PPO") PAREL-58 obtained from HERCULES, INC.; polyethylene oxide, ("PEO") obtained from ALDRICH CHEMICAL CO.; and poly{bis(methoxyethoxy)-ethoxy}-phosphazine ("MEEP"), obtained from ETHYL CORPORATION; and comparable commercially available polymers.

Impedances and capacitances of the glass and supercooled liquids prepared in the present invention were determined using a variety of different cells of cell constants chosen to suit the conductivity range in question. Ionic conductivities were determined automatically using a HEWLETT-PACKARD Model HP4192A-Frequency Analyzer. The initial study was conducted using an all-metal two electrode cell of cell constant about 0.02 $cm^{-1}$ which had been used extensively in previous research for measurements of conductivity in the range from $10^{-8}$ to $10^{-3}\Omega^{-1}cm^{-1}$. Measurements were automated to cover a predetermined temperature range at a sequence of temperatures controlled to ±0.1° C. by a EUROTHERM temperature controller. Conductivities were obtained from complex impedance plots in the standard manner. For higher temperature work where the conductivity of the system approaches $10^{-1}\Omega^{-1}cm^{-1}$, cells of larger cell constant were used. Cells of simple design requiring only small volumes of material were constructed using projecting platinum wire electrodes in a standard conductivity cell arrangement. These cells had cell constants in the range 0.5 to 2$cm^{-1}$.

The conductivities of liquid, supercooled liquid and glass states prepared in accordance with the present invention are illustrated in Examples 1, 8, 9 and 10. The conductivities of the same salt composition in polymer-free, rubberized, and plasticized rubber states using the particular salt composition described in Example 5 (and used also in Example 13), are shown as a function of reciprocal absolute temperature in FIG. 1. Electrolytes prepared by the other examples reported herein are similarly charted in FIG. 2 where they are compared with the best results obtained from the prior art practices. The legend on each drawing identifies the example number or the essential components of the electrolyte plotted. The plots identified with surnames identify the inventor(s) of the U.S. Patent in which the reported material was first disclosed. The highest-conducting $LiClO_4$ solution in low molecular weight PPO (4000) is also included for comparison.

In one practice of the present invention to produce a room temperature $Li^+$-conducting liquid electrolyte suitable for use in the sponge or paste type of battery electrolyte, the salts LiBr (0.355 g), $LiClO_4$ (0.24 g) and $AlCl_3$ (0.55 g) were admixed in a dry-box and melted in a closed vessel at 120° C. In this practice, the strong Lewis acid, $AlCl_3$ combines with the Lewis bases $Br^-$ and $ClO_4^-$ to form a melt which is very resistant to crystallization at room temperature, and which is permanently stable as a liquid above 80° C. The conductivity of this melt is a remarkable $10^{-1.2}\Omega^{-1}cm^{-1}$ at 100° C. and $10^{-2.2}\Omega^{-1}cm^{-1}$ at room temperature (See FIG. 2). Even higher conductivities are obtained at temperatures down to 60° C. by using LiCl in place of LiBr in the above mixture although at the lower temperature, crystallization occurs more rapidly. High conductivity at low temperature can be obtained using the above described procedure when one part of $AlCl_3$ is mixed with one part of LiI to give the compound $LiAlCl_3I$ of generalized stoichiometry $LiAlX_4$ (where X symbolizes a halide). This substance melts at 80° C., has a conductivity of $10^{-1.1}\Omega^{-1}cm^{-1}$ at 100° C. and a conductivity $10^{-1.4}\Omega^{-1}cm^{-1}$ at 60° C. (supercooled). The lowest-melting $LiAlX_4$ composition has yet to be determined. One paste electrolyte made by mixing about two parts of the molten salt with one part of fine powdered alumina provided a conductivity of $10^{-3.3}\Omega^{-1}cm^{-1}$ at room temperature.

In another practice of the present invention to produce an ionic rubber, 1.50 g $LiClO_4$, 1.29 g LiSCN, 4.30 g LiI, 0.43 g LiBr, and 1.15 g $Mg(ClO_4)_2$ as well as 0.99 g PPO (high MW) were dissolved in acetone to yield a syrupy solution. The acetone and any residual water introduced with incompletely dried LiSCN were thereafter removed by a combination of heating and vacuum evaporation, taking care not to exceed 100° C. (removal of water and acetone confirmed by weight). This procedure provides a rubbery electrolyte containing 80 mol percent lithium salts and has a conductivity of $10^{-4.5}\Omega^{-1}cm^{-1}$ at room temperature and greater than $10^{-2}\Omega^{-1}cm^{-1}$ at 100° C. No rubbery electrolyte has been previously reported to have a higher conductivity at 100° C. and, in addition, this conductivity is $Li^+$– dominated. The ionic rubber is stable against crystallization since the same conductivity was obtained during slow heating as during slow cooling (see FIG. 1). Without the polymer addition, the quaternary salt supercooled liquid and glass ($T_g$ about −25° C.) has a conductivity two orders of magnitude higher than the rubber at −20° C. (see FIG. 1) but then crystallizes at a higher temperature. An increase of the polymer content up to about 30 percent appears to add further stability to the rubber, but decreases the conductivity at both high and low temperatures. The optimum combination of salt components and polymer for stability and high conductivity can be determined by the artisan using the present teaching. Because of the high concentration of lithium salts, the last part of the acetone used in the preparation procedure is very difficult to remove; (its thermodynamic activity coefficient appears to be less than 0.03 so it behaves like a liquid with normal boiling point about 200° C). If some acetone is deliberately allowed to remain in the rubber, it acts as a plasticizer to lower the glass transition temperature to bestow increased conductivity. For instance a rubber having the composition described above which contained a residual 0.2 g acetone (equivalent to ~10 mol percent), exhibited conductivity better than $10^{-4}\Omega^{-1}cm^{-1}$ as shown in FIG. 1. Data from two recent patents (Kronfli et al U.S. Pat. Nos. 5,009,970, and Knight et al U.S. Pat. No. 4,737,422) relating to the traditional type of salt-in-polymer rubber electrolyte, and from the original Armand Patent (U.S. Pat. No. 4,303,748), are included for comparison.

A related, but somewhat less successful, practice of the present invention, involves the introduction of a plasticizer in stoichiometric quantities as a "solvate" compound, e.g., $Mg(CH_3CN)(ClO_4)_2$, a compound having a melting point of only 90° C. This compound acts like a low-melting Li salt and promotes glass-forming properties on mixtures of lithium salts. For instance, when a mixture of 0.973 g $Mg(CH_3CN)_4(ClO_4)_2$ with 0.536 g $LiClO_4$ and 0.425 g of $LiNO_3$, is fused at 100° C. in a capped vessel, a liquid is obtained which is very resistant to crystallization. The conductivity of this melt was $10^{-4.5}\Omega^{-1}cm^{-1}$, and it provides a glass transition temperature of about −25° C. Solutions containing about 50 mol percent Li salts and 50 mol percent of the solvate salt are stable liquids at room temperature and have conductivities near $10^{-4.5}\Omega^{-1}cm^{-1}$ and $T_g$ near −45° C. This practice, and analogous practices in which the four moles of $CH_3CN$ are replaced by one mole of the less volatile tetraglyme TG (which is involatile when in contact with $Mg^{2+}$), provides long term liquid stability and overcomes the problem of room temperature crystallization for this type of liquid.

This latter practice allows small mole fractions of high molecular weight polymer to be readily dissolved in the electrolyte and provides rubbery materials as before. The rubbers in this practice, however, have improved flexibility. For instance, the conductivity of a rubber of the composition $24[Mg(ClO_4)_2TG]\cdot 76[55LiSCN\text{-}45LiI]$ containing ten mol percent of high molecular weight PPO repeat units is found to be $10^{-5.3}\Omega^{-1}cm^{-1}$. Both of these figures are competitive with the best unplasticized polymer salt electrolytes heretofore known, and we expect their $Li^+$ transport numbers to be superior.

To further aid in the understanding of the present invention and not by way of limitation, the following examples are presented.

EXAMPLE 1

As an initial study, a glass-forming mixture of lithium thiocyanate (LiSCN), lithium iodide (LiI), lithium nitrate ($LiNO_3$), and lithium perchlorate ($LiClO_4$) was prepared by mixing the salts in the quantities 0.323 g LiSCN, 0.227 g LiI, 0.307 g $LiNO_3$, 0.402 g $LiClO_4$ and heating the mixture in a glass vessel placed on a hot plate to about 120° C. The heated mixture is then quenched to a glassy state in liquid nitrogen. The quenched material is then stable and can be studied at temperatures up to 5° C. in a conductivity cell. A PERKIN ELMER differential scanning calorimeter (DSC-4)

was used to measure the glass transition temperature Tg, which was −20° C. Above 5° C., crystallization slowly occurred, but had this not occurred, an ambient temperature conductivity approaching $10^{-2}\Omega^{-1}cm^{-1}$ would have been realized. This system does not dissolve fully in polyethers because of the presence of $LiNO_3$. Moreover it tends to decompose at high temperatures hence serves only as an illustration of possibilities to be explored.

EXAMPLE 2

A glass-forming mixture containing four lithium salts ($LiSCN$, $LiClO_4$, Li acetate[LiOAc] and LiI) was prepared by mixing 1.57 g LiI, 1.17 g LiOAc, 1.55 g $LiClO_4$ and 3.85 g LiSCN and melting as above, and the salt mixed with 0.25 g of high molecular weight polypropylene oxide. To facilitate dissolution, acetonitrile was added as a molecular solvent. When a homogeneous solution was obtained, the solvent was removed by evaporation under vacuum at temperatures increasing from about 40° C. to about 120° C. A rubbery, transparent solid with $T_g$ of −17° C. was obtained having a slight brownish color resulting from traces of free iodine. The conductivity of the rapidly cooled rubber was circa $2\times10^{-4}\Omega^{-1}cm^{-1}$ at room temperature which is superior to any conductivity known for a rubbery solid electrolyte to which no plasticizers have been added.

EXAMPLE 3

The composition of Example 2 was simplified to contain only LiSCN and $LiClO_4$ in order to gain maximum conductivity at high temperatures. The rubber prepared by mixing 2.42 g LiSCN and 2.86 g $LiClO_4$ with 0.143 g of high molecular PPO according to the procedure of Example 2, has an excellent high temperature conductivity, $10^{-1.7}\Omega^{-1}cm^{-1}$ at 100° C. while retaining excellent stable rubber characteristics. The possibility of low temperature rubbers in this system has not been excluded. Even though partly crystalline at room temperature, this system gave conductivity of $10^{-5}\Omega^{-1}cm^{-1}$.

EXAMPLE 4

A rubbery electrolyte was made using the procedure of Example 2 with 3.417 g $Mg(ClO_4)_2$, 3.5 g $LiClO_4$ and 1.9 g PEO (MW $10^5$). This simple ionic rubber electrolyte has very good rubbery properties and adhesion to metal at temperatures of 90° C. and above, and conductivity at 100° C. of $10^{-1.9}\Omega^{-1}cm^{-1}$. This conductivity drops rapidly at lower temperatures due to crystallization.

EXAMPLE 5

Figure 2:
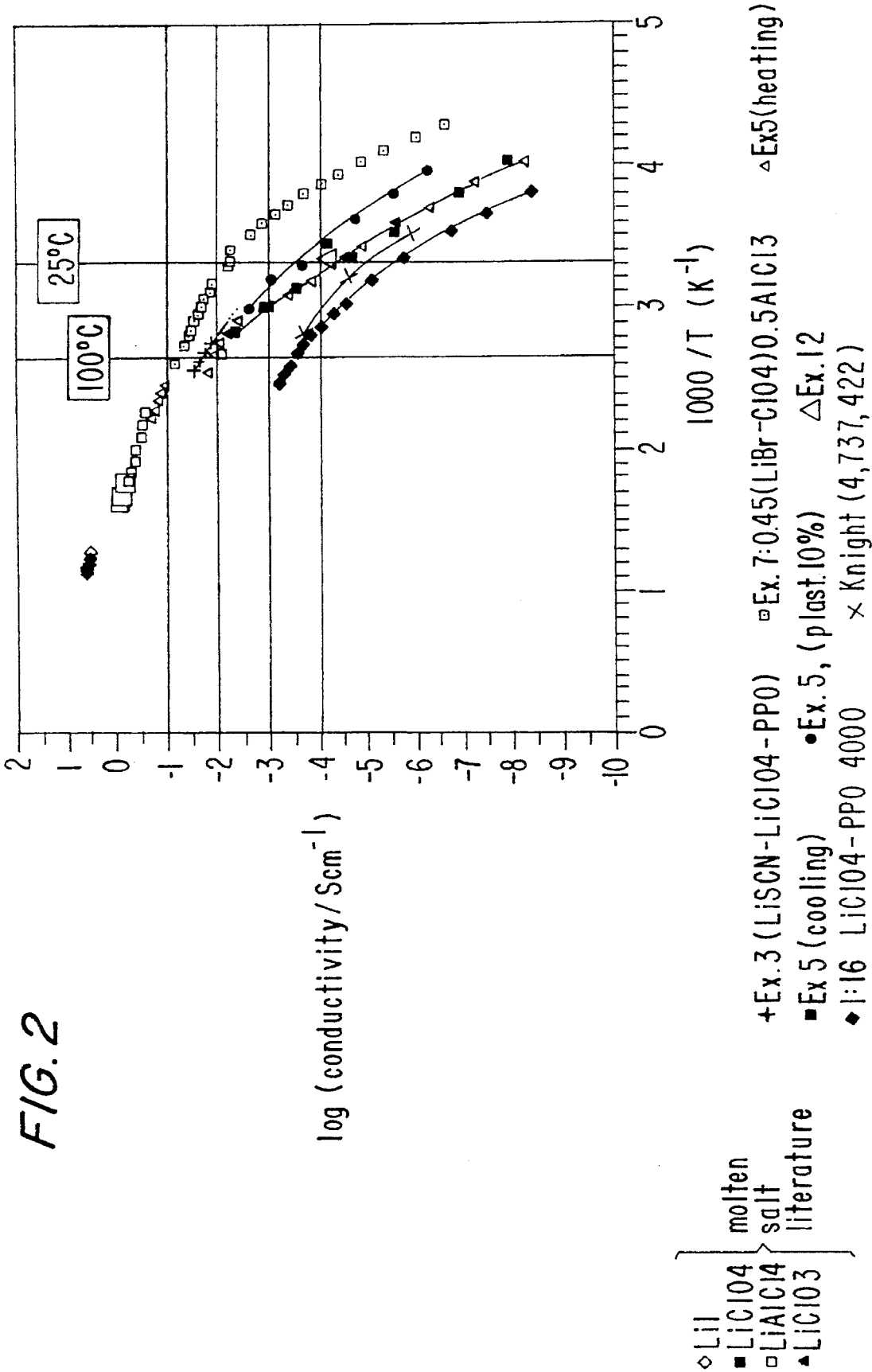
FIG. 2 is a like diagram for other embodiments of the present invention and the prior art.

A multicomponent mixture having good resistance to crystallization, good conductivity and excellent rubber characteristics was prepared according to the procedure of Example 1. In this preparation 4.30 g LiI, 0.43 g LiBr, 1.79 g LiSCN, 1.50 g $LiClO_4$, 1.15 g $Mg(ClO_4)_2$ and 0.99 g high molecular weight PPO are dissolved in acetone to yield a syrupy solution. The acetone and residual water (introduced with incompletely dried LiSCN) is then removed by a combination of heating and vacuum evaporation taking care not exceed 120° C. The removal of water and acetone is confirmed by weighing. This procedure produced a rubbery electrolyte containing 80 mol percent lithium salts with a conductivity of about $10^{-1.9}\Omega^{-1}cm^{-1}$ at 100° C. On cooling to room temperature, the conductivity was about $10^{-4.5}\Omega^{-1}cm^{-1}$. No previously reported rubbery electrolyte has a higher 100° C. conductivity and, in addition, the present conductivity is Li-dominated. The ionic rubber is stable against crystallization since the same conductivity was obtained during slow heating as during slow cooling as shown in FIGS. 1 and 2.

EXAMPLE 6

An example using fluorinated anion salts of lithium was prepared by mixing 0.876 g $LiBF_4$, 0.70 g Li $CF_3SO_3$ and 0.4 g PEO (MW $10^5$) and heating using acetone as solvent. The product after removal of 100 percent of acetone was partly crystalline, but had conductivity of circa $10^{-4}\Omega^{-1}cm^{-1}$ 20° C. Major improvements of this performance may be expected when new fluorinated anions, such as lithium perfluoromethane sulfonimide ("imide") and $C(SO_2CF_3)_3$ ("methide") are introduced.

EXAMPLE 7

The composition of Example 4 was modified to provide a lower glass transition temperature by replacing $Mg(ClO_4)_2$ by aluminum chloride ($AlCl_3$) in the mixture prior to melting. This provided a melt composition (in mole fraction) of 0.45 (LiBr-LiClO$_4$)—0.55AlCl$_3$. The melt which was made by admixing 0.355 g LiBr, 0.24 g $LiClO_4$, and 0.55 g $AlCl_3$, in a dry box and melting in a closed vessel, is very resistant to crystallization ($T_g$=−41° C.) and exhibits room temperature conductivity of $6\times10^{-3}\Omega^{-1}cm^{-1}$ and 100° C. conductivity of $10^{-1.2}\Omega^{-1}cm^{-1}$. These conductivities exceed those of any currently available salt-in-polymer or fast ion-conducting glass electrolyte. Data between 100° C. and −60° C. for this electrolyte are shown in FIG. 2. This melt composition is not fully compatible with high molecular weight polyethylene oxide giving a sponge rather than rubber when PEO (MW $10^5$) is incorporated into the system (using acetone as facilitator solvent) at less than 60 percent and blackening if temperature rises much above 60° C., during solvent removal. The conductivity of the sponge however remains high. The system is therefore presented as a superior Li conducting liquid electrolyte. It is preferred, when an aluminum salt is used in the salt mixture, to use poly[bis(methoxyethoxy)ethoxy)-phosphazine] (MEEP) as the polymer of choice to produce a stable rubbery solid electrolyte having conductivity exceeding $10^{-4}\Omega^{-1}cm^{-1}$.

EXAMPLE 8

To obtain an improved low-melting high Li$^+$-conducting liquid of simple tetrahaloaluminate stoichiometry, a melt containing 50/50 LiI:AlCl$_3$ was prepared according to the procedure of Example 7. This liquid, which is thermodynamically stable at 80° C., has conductivity of $10^{-1.2}\Omega^{-1}cm^{-1}$ at 100° C., low $AlCl_3$ volatility, and relatively low hygroscopicity. At 80° C., the conductivity is $10^{-1.3}\Omega^{-1}cm^{-1}$. It is an excellent low temperature, predominantly Li$^+$—conducting, solvent-free electrolyte, but has no ability to supercool to room temperature.

EXAMPLE 9

Using the procedure of Example 1, a mixture containing 0.75 mole fraction of aluminum chloride and 0.25 mole fraction of lithium imide (perfluoromethane sulfonimide) Li N(CF$_3$SO$_2$)$_2$ was heated and cooled to room temperature. The liquid was stable for prolonged periods of time at 25° C. and the system obtained a conductivity of $10^{-3.5}\Omega^{-1}cm^{-1}$. A glass forming mixture containing 0.75 mole fraction of the imide and 0.25 mole fraction of Li triflate (trifluoromethane sulfonate) on the other hand obtained only $10^{-7}\Omega^{-1}cm^{-1}$ at 25° C.

EXAMPLE 10

Using the procedure of Example 7, a mixture consisting of 0.63 g $LiClO_4$ and 1.96 g $AlCl_3$, was melted and cooled. The conductivity at room temperature was $1.5\times10^{-3}\Omega^{-1}cm^{-1}$. When the weight of aluminum chloride was reduced to 1.37 g, (thus 63.5 mol percent $AlCl_3$) the conductivity at room temperature rose to $3.3\times10^{-3}\Omega^{-1}cm^{-1}$. The glass transition temperature of this liquid was determined to be −44° C. This mixture is very hostile to polypropylene oxide or polyethylene oxide polymer and requires an alternative polymer.

EXAMPLE 11

By mixing 0.973 of g Mg $(CH_3CN)_4(ClO_4)_2$, a solvate compound, with 0.536 g $LiClO_4$ and 0.425 g of $LiNO_3$, and fusing the mixture at 100° C. in a capped vessel, a liquid which is very resistant to crystallization and which appears to be thermodynamically stable at room temperature is obtained. The conductivity of this melt is found to be $10^{-4.5}\Omega^{-1}cm^{-1}$ at room temperature, and it has a glass transition temperature of about −25° C. Solutions with less than 50 mol percent Li salts are certainly stable as liquids at 25° C., and their conductivities are comparable because their $T_g$s are lower. This example provides a demonstration of one manner in which long term stability against crystallization in this type of system can be obtained, although $CH_3CN$ remains somewhat volatile. This problem is addressed, by replacing the $CH_3CN$ molecules by a single chelating molecule, in Example 12.

EXAMPLE 12

A liquid containing chelated $Mg^{2+}$ ions as one component is prepared as follows: (anhydrous) $Mg(ClO_4)_2$ and tetraglyme (TG) are mixed in 1:1 proportions and dissolved in acetone. Vacuum evaporation is then used to quantitatively remove the acetone. The liquid $Mg(ClO_4)_2 \cdot TG$ is stable at room temperature indefinitely and has a $T_g$ of 30° C. 3.578 g of $Mg(ClO_4)_2 \cdot TG$ is then mixed with 0.305 g LiSCN and 0.517 g LiI (the latter two being in the binary eutectic proportions) and heated with acetone solvent to dissolve. On removing the acetone, a stable liquid is obtained, in which tetraglyme remains bound to the $Mg^{2+}$. Its conductivity at 25° C. is $10^{-4.5}\Omega^{-1}cm^{-1}$, and its glass transition temperature is about −25° C. The more salt-rich case 79[$Mg(ClO_4)_2 \cdot TG$] ·21[55LiSCN·45 LiI] is also stable at room temperature and forms a good rubber when 10 percent PPO is added using the procedure of Example 2. The conductivity was $10^{-5.3}\Omega^{-1}cm^{-1}$ at 25° C.

EXAMPLE 13

The material of Example 5 is modified by the addition of 0.2 g of acetone (amounting to 10 mol percent acetone) and heating in a closed tube to 100° C. for sufficient time for the acetone to diffuse through the entire rubber. This leads to a significant increase in conductivity, presumably due to a lowering of the glass transition temperature because the increase is most pronounced at low temperature. At 25° C. the volatility of the acetone is very low. The conductivity of the modified material is $10^{-3.7}\Omega^{-1}cm^{-1}$ at room temperature.

From the foregoing, it is readily apparent that a useful embodiment of the present invention has been herein described and illustrated which fulfills all of the aforestated objectives in a remarkably unexpected fashion. It is of course understood that such modifications, alterations and adaptations as may readily occur to the artisan confronted with this disclosure are intended within the spirit of this disclosure which is limited only by the scope of the claims appended hereto.

Accordingly, what is claimed is:

1. A lithium ion conducting electrolyte with high conductivity used in a battery operating at temperatures of 100° C. or lower and comprising a mixture of two or more lithium salts selected from the group consisting of thiocyanate, iodide, bromide, chloride, nitrate, perchlorate, acetate, tetrafluoroborate, thiohalodialuminate, trifluoromethane sulfonate, haloaluminate, halodialuminate, and perfluoromethane sulfonimide, and from 0 to not more than 10 mol percent of a molecular solvent, said mixture having been heated sufficiently to yield an ionic liquid and thereafter cooled, without crystallization to 100° C. or lower.

2. An electrolyte according to claim 1 having a conductivity of about $10^{-2.2}\Omega^{-1}cm^{-1}$ at 100° C.

3. An electrolyte according to claim 1 having a conductivity of about $10^{-2.2}\Omega^{-1}cm^{-1}$ at room temperature.

4. An electrolyte according to claim 1 in which said haloaluminate is tetrahaloaluminate.

5. An electrolyte according to claim 1 in which said halodialuminate is hexachlorobromodialuminate.

6. An electrolyte according to claim 1 in which said mixture further contains a magnesium salt selected from the group consisting of perchlorate and acetate.

7. An electrolyte according to claim 6 further containing a molecular constituent selected from the group consisting of $CH_3CN$, $CN-(CH_2)-CN$, $(CH_3 -O-CH_2-CH_2-O)_2$ which has been selectively solvated by the $Mg^{+2}$ cations to lower the freezing point of the electrolyte while maintaining its high ionic conductivity.

8. An electrolyte according to claim 1 to which is added a high molecular weight polymer to provide an ionic rubber electrolyte having conductivity of at least $10^{-4}\Omega^{-1}cm^{-1}$ at room temperature and at least $10^{-2}\Omega^{-1}cm^{-1}$ at 100° C.

9. An electrolyte according to claim 8 containing at least 60 mol percent of a lithium salt mixture and not more than 40 mol percent of said high molecular weight polymer which is soluble in said lithium salts.

10. An electrolyte according to claim 9 further containing $Mg(ClO_4)_2$.

11. An electrolyte according to claim 8 containing at least 75 mol percent of said lithium salt mixture.

12. An electrolyte according to claim 8 containing not more than 25 mol percent of said high molecular weight polymer.

13. An electrolyte according to claim 8 in which said high molecular weight polymer is polypropylene oxide.

14. An electrolyte according to claim 8 in which said high molecular weight polymer is polyethylene oxide.

15. An electrolyte according to claim 8 in which said high molecular weight polymer is poly{bis(methoxyethoxy)-ethoxy}-phosphazine, 16. An electrolyte according to claim 8 in which said electrolyte contains not more than 10 mol percent of a molecular solvent.

17. An electrolyte according to claim 16 in which said molecular solvent is acetone.

18. An electrolyte according to claim 1 which is solvent free.

19. An electrolyte according to claim 18 in which said ionic liquid is clear and homogenous and free of crystalline material.

20. An electrolyte according to claim 1 comprising lithium haloaluminate having a powdered alumina admixed therein before cooling and which obtains an ambient temperature conductivity of $10^{-3.3}$ $\Omega^{-1}\text{cm}^{-1}$.

21. A liquid ionic electrolyte containing lithium perfluoromethane sulfonimide to which is added sufficient molecular $Al_2Cl_6$ to lower the freezing point of the electrolyte to below room temperature while maintaining high ionic conductivity.

* * * * *